United States Patent [19]
Mugno et al.

[11] Patent Number: 5,561,942
[45] Date of Patent: Oct. 8, 1996

[54] FIRE ANT KILLING DEVICE AND METHOD

[76] Inventors: Matthew W. Mugno; John F. Mugno, both of Rte. 12, Box 400, Texarkana, Ark. 75502

[21] Appl. No.: 255,683

[22] Filed: Jun. 8, 1994

[51] Int. Cl.$^6$ .................................................. A01M 17/00
[52] U.S. Cl. .................................................. 43/129; 43/124
[58] Field of Search ........................................ 43/124, 129

[56] References Cited

U.S. PATENT DOCUMENTS

| | | | |
|---|---|---|---|
| 1,529,785 | 3/1925 | Hammond et al. | |
| 1,614,015 | 1/1927 | Neuls | |
| 1,930,588 | 10/1933 | Dibble | 167/3 |
| 2,655,406 | 10/1953 | Loy et al. | 299/86 |
| 2,685,146 | 8/1954 | Stevens | 43/129 |
| 3,205,176 | 9/1965 | Tenney | 43/129 |
| 3,239,960 | 3/1966 | Stevens | 43/129 |
| 3,382,603 | 5/1968 | Oberto | 43/129 |
| 3,575,349 | 4/1971 | Stahl | 239/135 |
| 3,582,496 | 6/1971 | Pfaffenbach | 252/359 A |
| 3,607,780 | 9/1971 | Scott | 252/359 A |
| 3,646,701 | 3/1972 | Pfaffenbach | 43/129 |
| 3,782,026 | 1/1974 | Bridges et al. | 43/124 |
| 4,005,976 | 2/1977 | Rombach | 43/124 |
| 4,026,330 | 5/1977 | Dunn | 43/124 |
| 4,160,336 | 7/1979 | Query et al. | 43/132 A |
| 4,173,094 | 11/1979 | Nichols | 43/129 |
| 4,298,167 | 11/1981 | Stahl et al. | 239/129 |
| 4,343,719 | 8/1982 | Stevens et al. | 43/129 |
| 4,512,515 | 4/1985 | Tenney | 239/129 |
| 4,756,118 | 7/1988 | Evans et al. | 43/132.1 |
| 4,811,901 | 3/1989 | Stevens et al. | 43/129 |
| 4,829,706 | 5/1989 | Perry | 43/125 |
| 5,109,629 | 5/1992 | King et al. | 43/132.1 |
| 5,154,018 | 10/1992 | Livington | 43/125 |

*Primary Examiner*—Kurt Rowan
*Attorney, Agent, or Firm*—John W. Montgomery; Ross, Clapp, Korn & Montgomery, L.L.P.

[57] ABSTRACT

A hand-portable fire ant killing device for vaporizing liquid resmethrin and infusing vaporized resmethrin throughout a fire ant mound on ground includes a dome, sized for fitting over a fire ant mound to be exterminated, having a top and an interconnected lower lip for contacting the ground entirely around the fire ant mound and for forming a closed interior chamber above the ant mound, a lightweight, high temperature gas discharging device which is mounted on the top of the dome, a high temperature gas discharging manifold directed into the closed interior chamber between the dome and the ant mound, a tank for containing resmethrin without pressurization which is mounted on top of the dome and a metering chamber and conduit which are connected for delivering a predetermined amount of resmethrin by a force overcoming the pressure in the dome for vaporization therein. The vaporized resmethrin in the high temperature gas is discharged under a small positive pressure into the closed interior chamber of the dome for infusion throughout the mound to kill all ant inhabitants.

2 Claims, 2 Drawing Sheets

FIRE ANT KILLING DEVICE AND METHOD

TECHNICAL FIELD OF THE INVENTION

The present invention relates to a device and method for killing fire ants, and more particularly to a device for vaporization of resmethrin and pressurized infusion throughout a fire ant mound.

BACKGROUND OF THE INVENTION

Prior devices have been known for fogging fruit trees to eliminate various pests, using a tarp or covering over the fruit tree and evaporating certain pesticides, such as hydrocyanic acid as in U.S. Pat. Nos. 1,529,785 and 1,614,015 and ammonia carbon monoxide as in U.S. Pat. No. 1,938,588, and transmitting the vaporized lethal pesticide with the exhaust gas under the tree covering. The volume of fumigant required for treating fruit trees was substantial, and generally requires vehicles for transporting the large quantity of fumigant, the hoses and the engines, which both propel the vehicles and provide the exhaust volume to fumigate trees.

Other small hand-carried or hand-propelled wheeled apparatuses for spraying fluid materials, such as DDT shown in U.S. Pat. No. 2,685,146, or other fluid materials admixed with exhaust gas and propelled through a nozzle, such as those in U.S. Pat. No. 2,655,406, as well as various other arrangements of exhaust nozzle spraying devices, such as those disclosed in U.S. Pat. Nos. 3,382,603, 3,575,349 and 4,298,167.

One portable device, as in U.S. Pat. No. 4,829,706, disclosed a two-cycle engine on an inverted bowl to inject carbon monoxide from the engine exhaust into rodent burrows. There was no suggestion of using the device for insect control or for vaporizing any insecticide. Further, there was no visible means for observing the interior of the bowl to confirm proper operation.

For purposes of tear gas dispersion, two-cycle engines have been suggested because they are lightweight, operate at high heat temperatures and have high volume exhaust discharge. In such devices, venturi action is used for drawing out liquid into a manifold for discharge via an airblower. The use of such general dispersion fogging devices has not previously been found to be effective for fire ant mound destruction, as the first small amount of disruption to the fire ant mound causes the queen to be moved through lateral passages deeper underground and thus out of reach of topically applied fumigation fogs.

In one recent patent, U.S. Pat. No. 5,154,018, the technology for high volume thermal fog generation, similar to that disclosed in U.S. Pat. Nos. 3,582,496 and 4,512,515, was employed to both obtain the high temperature generally thought to be required for vaporizing pyrethrins, such as tetramethine, cinerin and resmethrin, typically in combination with other rotenone or other pyrethrins and inert ingredients in a petroleum-based carrier typically in the range of about one part insecticide to about five to ten parts petroleum-based carrier such as diesel or fuel oil. In this apparatus, the engine drives a compressor which applies compressed air into a combustion chamber in which the fuel and insecticide mixture is combusted and then provided through a hose to a boot having a skirt therearound which is placed over the ant mounds. Because it is desirable to have high volume and high temperature, as produced by a thermal fog-generating unit, this apparatus is large, cumbersome and requires large quantities of pesticide and fuel mixture.

The treatment of treating ant mounds has also been done using pressurized thermal aerosol fog-generating devices as shown in U.S. Pat. No. 5,154,018, which disclosed the use of a boot and a flexible and plastic skirt-type covering. The device described in the '018 patent utilized high pressure, high volume fog produced from a combustible mixture of insecticide and fuel. This device required a high pressure combustion chamber, fog-generating device such that portability was not convenient. Only areas in which large vehicles carrying the fog-generator could be effectively treated for fire ants in this manner. Further, such previous devices did not contemplate the use of pesticides having the type of low toxicity as resmethrin, which is a second-generation pyrethroid pesticide and which was first manufactured in 1967.

While resmethrin has become one of the most widely used of the second-generation pyrethroids for indoor sprays and aerosols for controlling flying and crawling insects indoors, its use has not been widely adopted for killing fire ants. A topical application of the resmethrin on fire ant mounds merely resulted in temporary disruption of the mound activity. The biodegradability and the solar-degradability of resmethrin, which results within hours, would not provide a long-lasting, complete kill of the ant mound. Further, the effective use of resmethrin, which, at room temperature, is a solid, waxy substance and is not soluble in water, is dependent upon topical deposit upon the insects. In previous aerosol or other type of spray applicator, use of a solvent such as kerosene or, preferably, an inorganic carrier such as xylene, methylene chloride, isopropyl alcohol or aromatic petroleum hydrocarbons.

Other attempts to exterminate ants, such as fire ants, in subterranean colonies typically included the application of vaporized pesticides through a lance. One such lance was disclosed as a freon-and-pyrethrin-insecticide-injecting lance as disclosed in U.S. Pat. No. 4,160,336. Another lance device used liquid pesticide, such as Diazinon™, Malathion™ or Dursban™ liquid solutions, vaporized in the exhaust of a rolling lawnmower.

One attempt to specifically inject resmethrin into a fire ant mound with a lance was disclosed in U.S. Pat. No. 4,756,118. In this device, a heater gun with an injection nozzle lance was inserted into the mound for the application of vaporized resmethrin. The active chemical, resmethrin, was carried in a petroleum distillate in a pressurized tank on the back of the operator. The solvent and resmethrin was forced by high pressure from the tank onto a high temperature heating coil where it was vaporized. The heating coil of the heater gun operated at temperatures of about 2,000° F., which according to the disclosure, was required to completely vaporize the resmethrin and petroleum distillate carrier. The vaporized resmethrin from the heating coil was injected from a nozzle in a lance, which was inserted several inches deep into the fire ant mound. The vaporized mixture permeated through the passageways of the ant mound and provided a substantially quick and complete kill of the fire ant mound. One difficulty, however, was that the apparatus was awkward, and the high temperature of the heating coil was subject to overheat and burnout unless a continuous flow of resmethrin and petroleum distillate could be maintained flowing over the heating coil in order to keep it from overheating. When moving from one mound to the next, the operator was instructed to periodically squeeze the trigger, thereby applying a stream of resmethrin and petroleum onto the heating element, and also producing a cloud of fumigate discharged into the air.

A simple, inexpensive, portable and dependable applicator for vaporizing and injecting resmethrin into fire ant mounds without the use of a lance or a pressurized spray nozzle was not previously known.

SUMMARY OF THE INVENTION

The present invention uses a high temperature exhaust of a small, two-cycle internal combustion engine to vaporize the resmethrin. The engine exhaust is used to pressurize an applicator dome, which is placed entirely over the fire ant mound. The engine exhaust, with the vaporized resmethrin therein, pressurizes the dome and forces the vapor throughout the passageways of the fire ant mound before the queen ant, or queen ants in mounds with multiple queens, can be moved to another location.

The engine is mounted on the dome, which fits over and engages the ground surface to provide a pressure shield around the periphery of the dome. A metered amount of resmethrin is deposited from a non-pressurized storage tank into a chamber from which it may be pumped, in measured amounts. When the required amount is determined, then the metered amount is supplied through another conduit by the force of gravity and/or pumping action into the interior of the hot exhaust pipe of the two-cycle engine. The exhaust gases of the two-cycle engine, at the point where the resmethrin is applied, operate in the range of about 500° F. to about 850° F., which is adequate to provide a substantial vaporization of the resmethrin when carried in an appropriate carrier solvent. The increased pressure within the dome is sufficient to force the vapor throughout the mound, yet does not create enough back-pressure to interfere with the operation of the internal combustion engine. It appears that the exhaust gases and the vaporized resmethrin are taken through the normal porosity of a fire ant mound and allows sufficient volumetric flow of exhaust gases to permit the engine to operate within a desirable range to maintain a sufficiently hot exhaust temperature to thoroughly vaporize the resmethrin.

With the present device, it was discovered that the 2,000° F. heating coil taught by the prior portable lance device and the pressurized tank were no longer required. Further, the need for high pressure, high temperature, fog-generating devices, as previously taught for dome fumigation of ant mounds, has been eliminated with the simple, hand-portable device of the present invention. Further, the volume of exhaust gases required for killing fire ants has been found to be sufficiently low so that a large volume of exhaust gas is not required, as was our case, for example, with tractor exhaust fumigating devices.

BRIEF DESCRIPTION OF THE DRAWINGS

The foregoing objects, advantages, and features, as well as other benefits, will become more fully understood with reference to the following specification, claims and drawings in which like numerals represent like elements and in which:

DETAILED DESCRIPTION OF THE PREFERRED EMBODIMENTS

Figure 1:
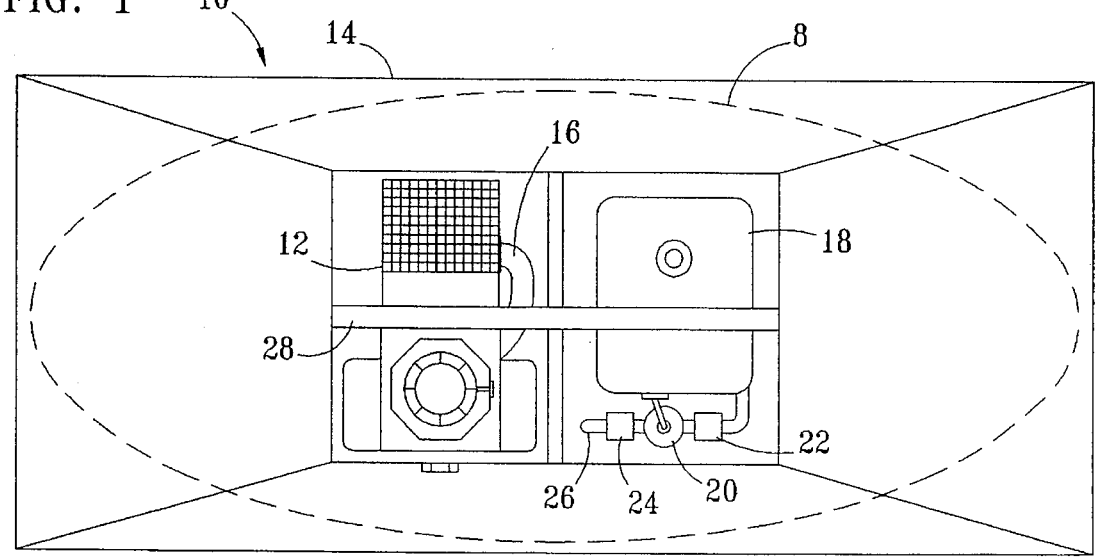
FIG. 1 is a top plan view of one preferred embodiment of the portable resmethrin-vaporizing ant killing device according to the present invention.

With reference to FIG. 1, which is a top plan view, the fire ant killing device, shown placed over an ant hill 8, which is depicted in hidden lines. The ant killing device 10 includes a means 12 for producing a high temperature gas, such as a two-cycle, internal combustion engine 12, which is mounted to the top of a dome 14. It has been found that a very small engine size of about 20 cubic centimeters (cc.) of displacement per stroke can be advantageously used with a dome having an internal volume of between about 0.4 cubic foot (cf.) and 1 cf. Other size engines will also work with domes of different sizes. Larger domes typically work better with larger engines. For example, a 25 cc. engine may be used on a 1–2 cf. dome; a 30 cc. engine may be used on a 2–3 cf. dome; and a 35 cc. engine may be used on a 3–4 cf. dome. The exhaust 16 from the two-cycle internal combustion engine, which is advantageously operating at a high temperature, is directed into dome 14. Preferably, and advantageously, the dome is constructed of a lightweight, clear plastic material, such as plexiglass, which permits observation of proper internal functioning. Also mounted on the top of the dome 14 is a pesticide supply tank 18 in which a mixture of resmethrin and a petroleum carrier such as kerosene, or an inorganic solvent such as xylene, methylene chloride, isopropyl alcohol, or other aromatic petroleum hydrocarbon, is carried. The pesticide supply tank, according to the invention, need not be pressurized and is therefore advantageously of lightweight construction.

Figure 2:
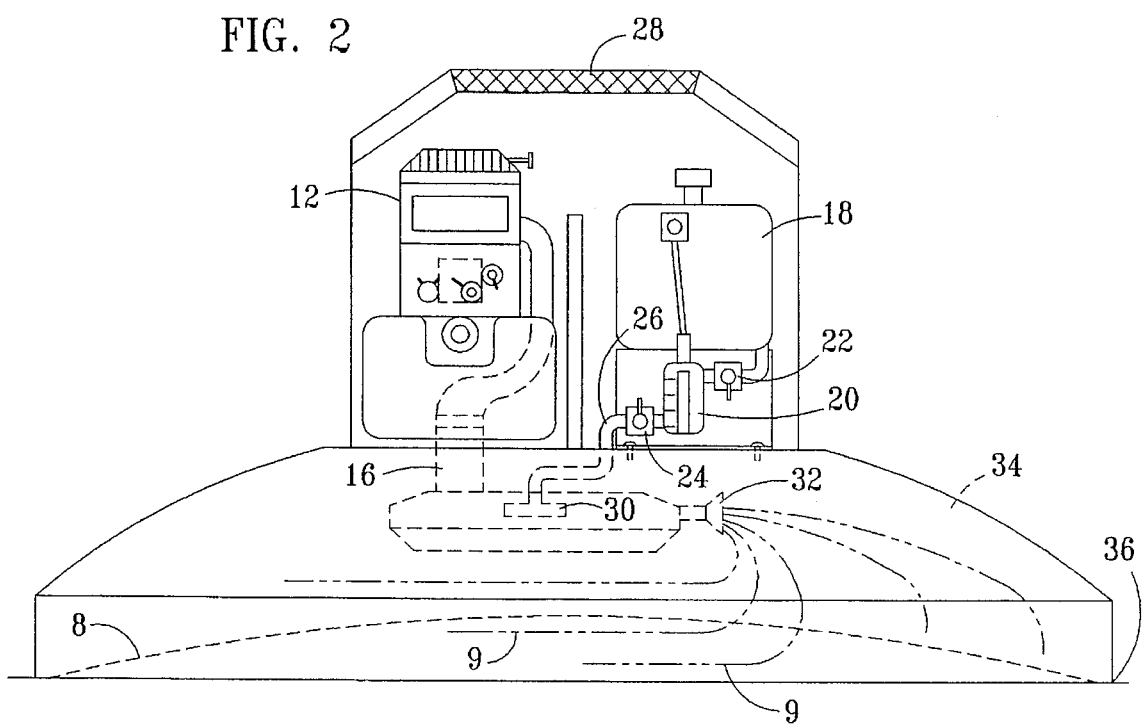
FIG. 2 is a side elevation view with a partial section through a portion of the dome along section line 2—2 of FIG. 1.

In one embodiment, as shown in FIGS. 1 and 2, a pesticide metering device 20 receives a desired amount of pesticide through the operation of intake valve 22. Advantageously, a conveniently positioned, inexpensive sight gauge 23, or sight tube 23, can be used to allow quick and accurate measurement for proper dosage depending upon the size of the ant hill to be exterminated.

Figure 3:
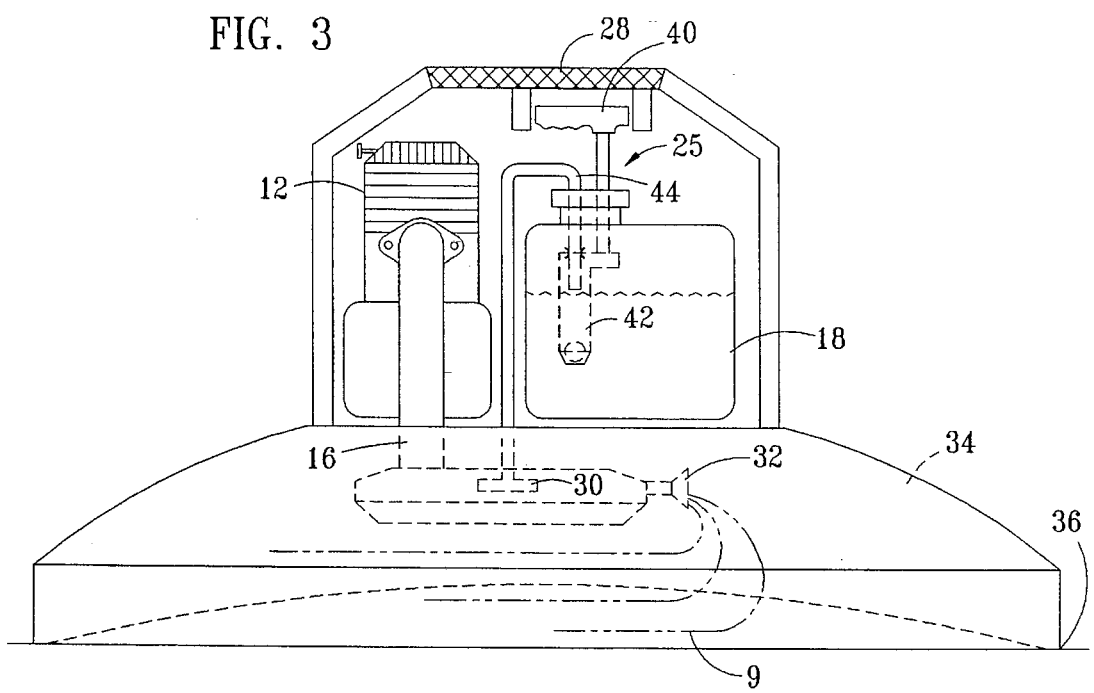
FIG. 3 is a side elevation view of an alternative embodiment of the invention showing a hand-operated metering pump for injecting resmethrin for vaporization.

In another preferred embodiment, as shown in FIG. 3, the dosage may be advantageously measured with a prescribed number of strokes on a mechanically operated pump 25. In this alternative construction, the metering sight gauge 23 and the valve 24 might be replaced entirely with a metering manually-operated pump device 25. A trigger 40 is conveniently accessed from handle 28 to actuate a pump chamber 42. Pesticide mixture in tank 18 is drawn in on the down stroke and forced through delivery tube 44 and into the exhaust 16 at the vaporization chamber 30.

A formulation of about 0.7%–1.3% resmethrin, or other equivalent, in a carrier or solvent has been found to work well. In a preferred construction using a pump dispenser 25, the application per mound would be measured by the number of strokes necessary to deliver the chemical to the mound, depending upon the size of the mound and the stroke volume of the dispensing pump. For example, five to fifteen strokes on a small manually-operated pump, such as a squirt pump or spray pump used on non-aerosol spray bottles, might be adequate. The pump must be constructed of a material which is resistant to chemicals. Thus, advantageously, the pesticide flows by the mechanical pumping force into the exhaust without the need for pressurization of the storage tank or other expensive constructions, such as venturi or carburetor action.

For portability, a handle 28 is provided by which the entire unit can be conveniently moved from one ant mound to the next without the need for a vehicle or other wheeled apparatuses which might otherwise limit access to ant mounds in hard-to-reach locations. The lightweight characteristics of the combination of a two-cycle engine, non-pressurized tank and small size advantageously permit easy portability.

With reference also to FIG. 2, it can be seen that exhaust 16 is directed into a vaporization chamber 30 within the interior 34 of dome 14. Similarly, pesticide discharge 26 is directed into the vaporization chamber where the high temperature exhaust causes the exhaust and petroleum carrier to be vaporized. The pulsating exhaust allows easy flow of the liquid pesticide. Advantageously, for purposes of using resmethrin (as opposed to other liquid pesticides with lower vaporization temperatures), the two-cycle engine exhaust can be running at a higher temperature than that of typical four-cycle internal combustion engines. Exhaust temperatures in the range of about 500°–850° F. can conveniently be obtained with the two-cycle engine. The volume of exhaust expelled from a two-cycle engine is often greater than the volume of exhaust expelled from a four-cycle engine of the same size. Further, the weight of a two-cycle engine, which does not require a large crankcase filled with lubricating oil, is much less than four-cycle engines or other pressurized thermal fog-generating combustion chambers.

The vaporized mixture of exhaust gases and pesticide is forced into the dome 14 interior volume 34 through exhaust vapor discharge nozzle 32. As the dome lip 36 engages the ground 7 around ant hill 8, a small positive pressure is created within interior volume 34. This small positive pressure forces the vapor and exhaust mixture through all the passages 9 of ant hill 8, thereby spreading the resmethrin throughout the mound. The effective dispersion into the mound can be advantageously observed where a clear plastic dome 14 is employed. It has been found that differential pressures from inside the dome to outside the dome, which are sufficient low to allow the internal combustion engine to continue to operate, yet sufficiently high to adequately cause the vapor to permeate the ant hill, including all lateral escape passages, are obtainable to thereby deposit resmethrin on all ant inhabitants of the mound. For example, a pressure differential of less than about 0.1 psi, or even less than about 0.5 psi, may be useful. The queen ants, the worker ants, the larvae and the eggs are all exterminated with one application.

Thus, what has been disclosed is an inventive lightweight, inexpensive, easy to operate, portable resmethrin-vaporizing ant killing device which provides observable, effective operation and a method for its use.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A hand-portable fire ant killing device for vaporizing liquid resmethrin and infusing vaporized resmethrin throughout a fire ant mound on ground comprising:

a. a dome, sized for fitting over the fire ant mound to be exterminated, having a top and an interconnected lower lip for contacting the ground entirely around the fire ant mound and for forming a closed interior chamber above the ant mound;

b. a lightweight, high temperature gas discharging means mounted on the top of said dome having a high temperature gas discharging manifold directed into said closed interior chamber between said dome and said ant mound, wherein said lightweight, high temperature gas discharging means comprises a two-cycle internal combustion engine having a high temperature exhaust gas discharging manifold directed into said closed interior chamber;

c. a tank for containing resmethrin without tank pressurization; and d. means for delivering a predetermined amount of resmethrin by force into said exhaust gas discharging manifold for vaporization therein and for discharge of said vaporized resmethrin and exhaust gas under a small positive pressure into said closed interior chamber of said dome, wherein said means for delivering a predetermined amount of resmethrin by force comprises a mechanical pump for receiving resmethrin from said tank as by the force of gravity and for directing a pump-metered amount of said resmethrin into said exhaust manifold of said two-cycle engine.

2. A hand-portable fire ant killing device as in claim 1 wherein said lightweight, high temperature, exhaust gas discharging, two-cycle engine is sized in the range of about 20 cc. to about 40 cc. displacement.

* * * * *